United States Patent
Buzian

(10) Patent No.: US 8,579,220 B2
(45) Date of Patent: Nov. 12, 2013

(54) SILENT BLENDER

(75) Inventor: Vanderlei Buzian, Curitiba PR (BR)

(73) Assignee: AB Electrolux, Stockholm (SE)

( * ) Notice: Subject to any disclaimer, the term of this patent is extended or adjusted under 35 U.S.C. 154(b) by 391 days.

(21) Appl. No.: 12/935,767

(22) PCT Filed: Mar. 31, 2009

(86) PCT No.: PCT/BR2009/000088
§ 371 (c)(1),
(2), (4) Date: Dec. 22, 2010

(87) PCT Pub. No.: WO2009/121154
PCT Pub. Date: Oct. 8, 2009

(65) Prior Publication Data
US 2011/0108647 A1    May 12, 2011

(30) Foreign Application Priority Data
Mar. 31, 2008 (BR) .................................. 8800947 U

(51) Int. Cl.
*B02C 4/06* (2006.01)
*B02C 11/04* (2006.01)

(52) U.S. Cl.
USPC ..................................... 241/282.1; 241/292.1

(58) Field of Classification Search
USPC ................................ 241/282.1, 282.2, 292.1
See application file for complete search history.

(56) References Cited

U.S. PATENT DOCUMENTS

| | | | |
|---|---|---|---|
| 3,064,949 A * | 11/1962 | Dewenter | 241/195 |
| 3,542,178 A | 11/1970 | Ripple | |
| 3,596,692 A | 8/1971 | Swanke | |
| 4,892,413 A * | 1/1990 | Vats | 366/349 |
| 5,273,358 A | 12/1993 | Byrne et al. | |
| 5,322,357 A * | 6/1994 | Mazer | 366/181.1 |
| 5,957,577 A * | 9/1999 | Dickson et al. | 366/197 |
| 6,523,993 B2 | 2/2003 | Williams et al. | |
| 6,680,551 B2 | 1/2004 | Bates et al. | |
| 7,350,963 B2 * | 4/2008 | Williams et al. | 366/205 |
| 7,387,269 B2 * | 6/2008 | Mally | 241/282.1 |
| 7,445,171 B2 * | 11/2008 | Areh et al. | 241/92 |
| 8,087,603 B2 * | 1/2012 | Kolar et al. | 241/285.3 |
| 2002/0141285 A1 | 10/2002 | Williams et al. | |
| 2005/0099884 A1 | 5/2005 | Lee | |
| 2005/0255201 A1 * | 11/2005 | Gruhot et al. | 426/115 |
| 2006/0176768 A1 * | 8/2006 | Williams et al. | 366/205 |
| 2006/0208119 A1 * | 9/2006 | Mally | 241/282.2 |
| 2007/0133347 A1 | 6/2007 | Mock et al. | |

(Continued)

FOREIGN PATENT DOCUMENTS

| | | |
|---|---|---|
| MU | 7701948-2 | 3/1999 |
| MU | 8102356-1 | 12/2003 |
| MU | 8303337-8 | 12/2004 |

*Primary Examiner* — Faye Francis
(74) *Attorney, Agent, or Firm* — Hunton & Williams LLP

(57) ABSTRACT

Blender whose operation presents a sound level lower than that of other equipment available in the market. This effect is obtained by the combination of construction details that when associated, result in a differential operation volume. The first construction detail is the design of the blender jar that facilitates the motion of the contents when the equipment is working. The second is presented in a system to absorb shocks during the transmission of the motor motion to the crushing blades, minimizing the vibration of the assembly. The third construction detail is the connection system of the motor with the transmission axle of the crushing blades that also helps the decrease of vibration of the equipment.

9 Claims, 3 Drawing Sheets

(56) References Cited

U.S. PATENT DOCUMENTS

| | | | |
|---|---|---|---|
| 2009/0238034 A1* | 9/2009 | Ulanski | 366/341 |
| 2010/0014380 A1* | 1/2010 | Kolar et al. | 366/347 |
| 2010/0038462 A1* | 2/2010 | Kolar et al. | 241/285.3 |
| 2013/0077433 A1* | 3/2013 | Conti | 366/205 |

* cited by examiner

SILENT BLENDER

This invention relates to a blender whose operation presents a sound level lower than that of similar equipment available in the market. This effect may be reached by the combination of construction details that are associated with one another. The first construction detail is the shape of the blender jar that facilitates the motion of the contents when the equipment is working. The second is presented in the absorption of shocks, along the transmission, of the motor motion up to the crushing blades, minimizing the vibration of the assembly. And the third construction detail is the motor connection system to the transmission axle motion to the crushing blades that also help to diminish the vibration of the equipment.

HISTORY OF THE INVENTION

Electrical appliances for blending and crushing of food, also called blenders, are traditionally presented as noisy equipment, as their operation is based on the high-speed rotation of a motor that drives an axle for driving blades that crush and blend the food placed in the blending jar. The entire set vibrates with the operation of the motor, contributing to increased sound level of the apparatus during operation. Additionally, the forced circulation of the cooling air, by means of the fan coupled to the motor of the equipment, also contributes to the generation of the operation noise.

The document MU8303337-8 describes a blender with a filter, and having a driving unit, a drive button and a control of the blender functions. It discloses a coupling system with the upper cup by means of coupling or joint means with complementary couplings, provided on the outside face of the drive unit. The document shows a blender without mentioning any characteristic directed to the minimization of the sound level of its operation.

The document MU8102356-1 discloses a coupling for a blender, with a base shaped as a cylindrical cup that has inside a flexible part with rigid material bushing, with an axial hole of polygonal section, in which is fit a square bar. This bar is fixed at the end of the axis of the crusher existing in the bottom of the blender cup, while the base is fixed on the engine motor shaft. Such characteristics, notwithstanding the presence of flexible material in the coupling between the blender parts, does not disclose characteristics similar to the coupling of the present invention.

The patent MU7701948-2 refers to a blender with cup integrated to the base of the blades and a cleaning system that drives at a specific revolution without need to be dismounted. It does not address any action for the minimization of the noise when the equipment is operating.

The document U.S. Pat. No. 6,680,551B2 foresees a noise damping system for an electric motor, incorporated to the casing of the electric motor to increase the air flow by the motor and to reduce the noise that escapes from the casing. It does not foresee the provision of damping and flexible coupling to the blender, in distinction to the present invention.

The document U.S. Pat. No. 5,273,358 proposes a noiseless and efficient arrangement for a motor cooling fan applied to a blender that includes a jar arrangement, a motor and casing arrangement and a cooling fan and noise damper arrangement. The document describes an electric motor noise damper characterized by promoting a predetermined air flow in the apparatus casing, lowering the noise generated by the motor operation. But, it does not foresee the damping and flexible coupling systems to minimize the noise, such as in the present invention.

The document U.S. Pat. No. 6,523,993 describes a coupling for a blender, comprising of a first and a second coupling. The first coupling, connected to a motor, is adapted to be driven rotationally. The second coupling is connected to the rotating cutter set inside the blending jar. Both couplings comprise, each one, a plurality of teeth, each tooth comprising a driving face that has a corresponding feature on the other coupling. It is different from the present invention by not foreseeing a flexible coupling and the limitation to only two coupling elements.

BRIEF DESCRIPTION OF THE INVENTION

The blender described in this invention comprises a series of inventive aspects that, in combination, result in a synergistic reduction of the noise level during the operation of the equipment. Thus, the combination of a jar of essentially triangular profile, which helps in the ordering of turbulence, a transmission system provided with flexible joints that absorb the impact of vibration of the motor, and a system to connect the motor with the blade axle that is able to minimize the generation of vibration created during electrical operation, presents a low noise level when compared with similar marketed devices.

Thus, the use of several associated construction details allows a significant diminution of the sound level produced by the operation of a blender, supplying an electrical appliance of known use operation, but with a significant difference of lower noise generation during its operation, contributing, thus, to domestic comfort.

The device for conditioning of the food to be blended or crushed, called the cup or jar, is placed on the upper part of the electrical appliance, and coupled to the base by means of fitments or threads, fixing them for the operation of the apparatus. The cup may comprise any rigid material, preferably transparent and washable material, like glass or plastic. Its shape is essentially tubular or frustroconic, with variations of the straight section, from circular to polygonal. It may present internal flanges or housings, essentially perpendicular to the vertical wall, whose purpose is promoting a bigger churning of the blending under stirring, when the apparatus is working. Also its shape, particularly the straight section of the jar, has an influence on the churning, giving a better blending of the mass under stirring. As consequence of the churning, there is a generation of noise that may be minimized due to a geometric shape of the jar that balances the churning and the sound level during the operation.

Nevertheless, the bigger noise source is the operation of the equipment motor that works at high revolutions to give enough power to the blades so that they may perform their role of blending and crushing the food placed in the jar. This operation requires a cooling that is provided by the forced displacement of air from a fan coupled to the motor axle, and this air flow generates a considerable noise in its passing by the equipment. Several initiatives have sought solutions to this issue, specifically damping systems characterized by enclosing the motor to minimize the sound level by the movement of the cooling air flow that is driven by the fan coupled to the motor, and preventing the dispersion of the cooling air flow and making it possible to direct the air along the motor in operation.

Besides the noise damping, there also can be speed operation control of the equipment motor, tailoring it to the operation demand according to the kind of blending being processed in the jar. Traditionally, this control is made by hand, by the selection of a power or speed of operation according to keys or buttons placed on the blender body, making possible the choice of operation of the equipment according to the user's criteria. Thus, when a given button is pressed, a corresponding power level acts on the motor, obtaining the desired effect in revolution speed of the blending and crushing blades until the equipment is turned off or other speed option is selected. Another alternative is employing an electronic controller to manage the power delivered to the equipment, by a demand required to the operation generated by the kind of material being processed. That is, the electronic device perceives the demand necessary to the operation of the equipment and controls the minimal power required for the operation, energizing the motor according to the needs of the identified demand.

The vibration of the electrical appliance during the operation is another additional noise source, as the shaking causes shock between the comprising parts. Thus, measures that minimize this vibration become important tools for the containment of the sound level generated by the operation of the blender. One of the alternatives is the damping of the vibration along the transmission of the motion generated by the motor up to the blending and crushing blades in the upper jar. A series of flexible joints, placed on the interfaces along the transmission axis of the motor motion up to the crushing blades comprise a damping system able to substantially reduce the sound level of the equipment in operation. Such joints may comprise several resistant and flexible materials, like silicon, natural or synthetic rubber, EVA or others that give an equivalent effect, to absorb impacts between the parts in the interfaces.

Still referring to minimization of vibrations, it is identified that the fit between the upper jar and the blender base is a source of significant vibrations. Normally this fit is provided with a groove and tongue type of coupling, in which the parts are coupled and the transmission of the motion is provided by flanges or a set of essentially vertical projections and recessions that couple and contact each other by means of their vertical faces, so that the coupling directly driven by the motor moves the corresponding coupling connected to the jar, thereby rotating the jar blades. The existence of looseness between the flanges of the groove and tongue coupling causes the vibration and, consequently, the generation of noise due to the operation of the appliance.

DETAILED DESCRIPTION OF THE INVENTION

This invention describes a blender for food processing, configured to provide a silent operation, when compared to those available in the market. This sound differential is reached by the adoption of a set of combined solutions, whose synergy results in the marked minimization of the sound level during the operation of the appliance.

Figure 1:
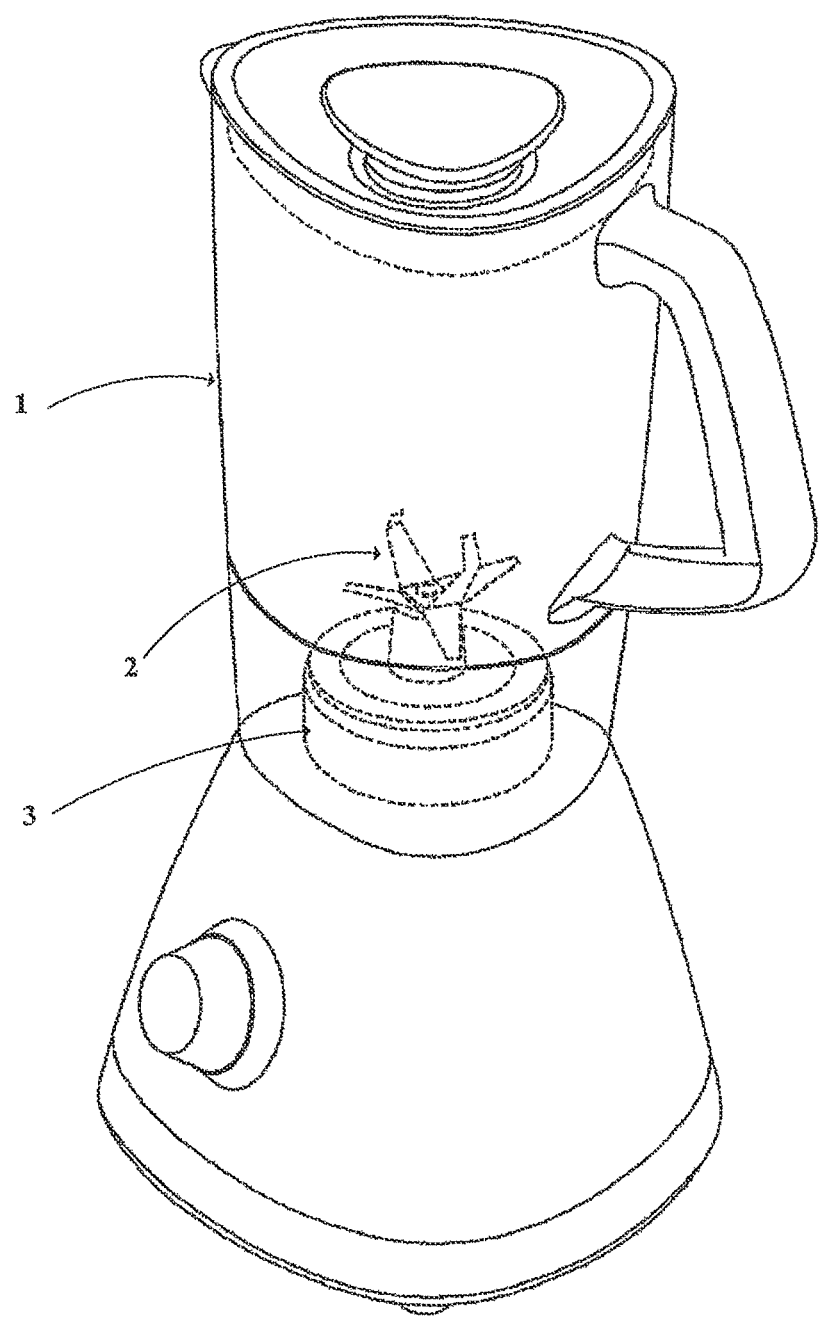
FIG. 1 shows a view in perspective of a blender fitted with a jar (1) with the blades (2) located on the base (3) of the unit.
Figure 2:
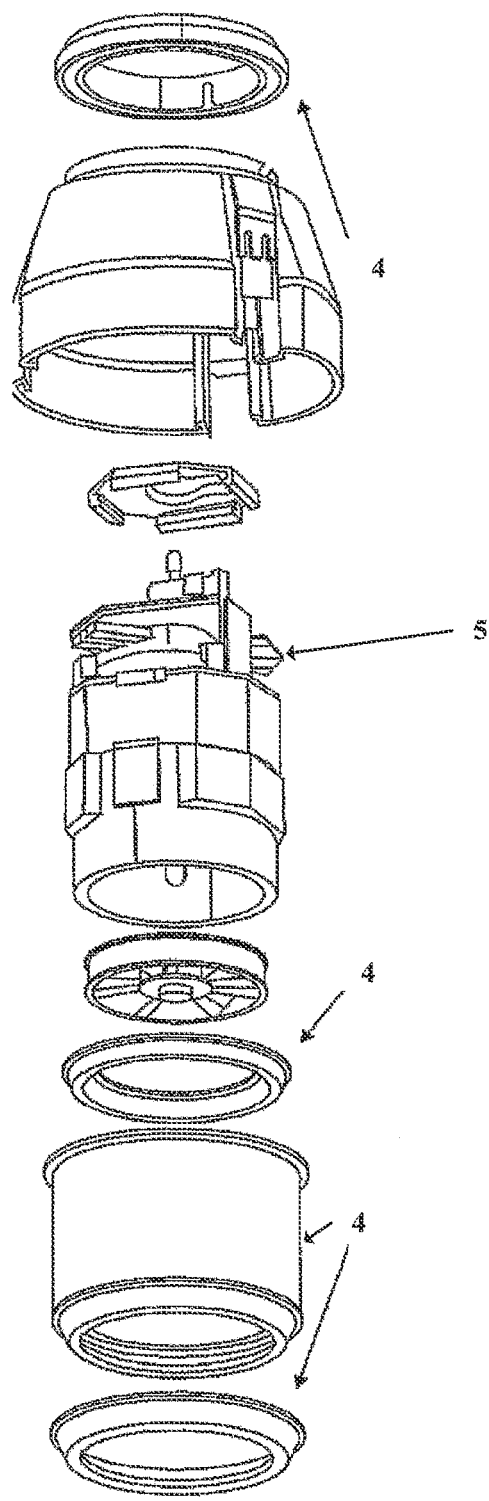
FIG. 2 shows an exploded view of the base (3) of the blender, showing schematically the system of transmission of motion of the motor (5) up to the grinding blades (2), which has flexible joints (4) for smoothing of shocks.

Firstly, in order to lower the vibration of the apparatus during its crushing operation of blending of food placed in the jar (1), the appliance includes a damping system along the transmission of the motion created by an electric motor (5) provided in the appliance base, as shown in FIG. 2. This damping system is comprises flexible joints (4) placed in the coupling interfaces present during the motion transmission. These flexible joints (4) may comprise material able to absorb the impacts resulting from the motor operation (5) and that cause the vibration of the apparatus, such as natural rubber, synthetic rubber, silicon, EVA or any other materials able to provide the same effect of minimizing the shocks on the coupling interface zones.

Figure 4:
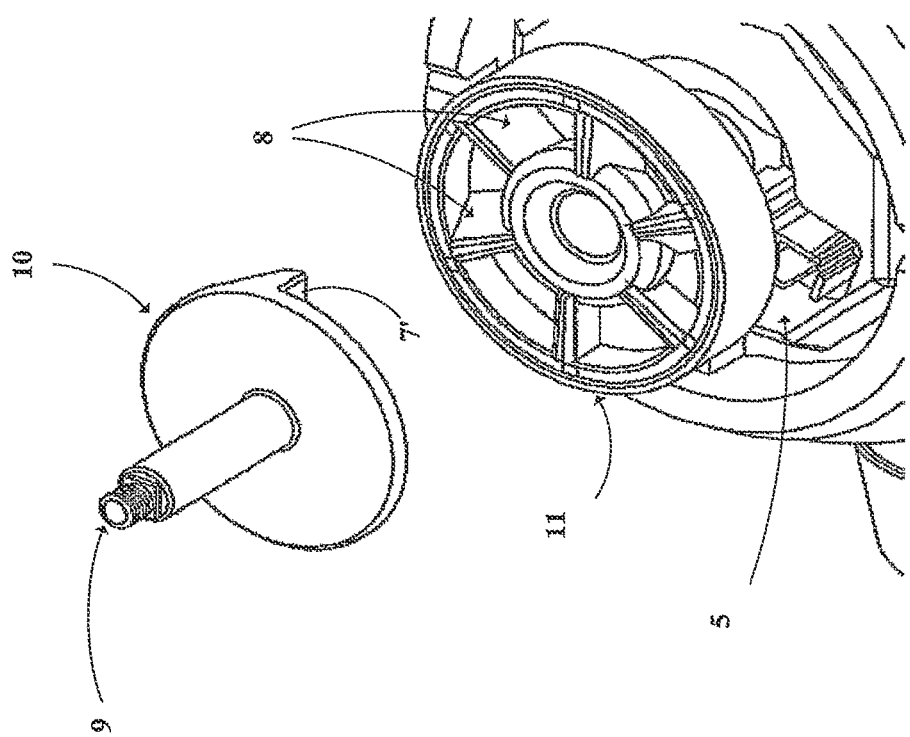
FIG. 4 shows a view in perspective of the connection system of the motor (5) with the transmission axle (of movement to the blades (2), showing the driven member (10) of the jar (1) and the driving member (11) on the base (3) that form the connection system that is connected the motor (5).
Figure 3:
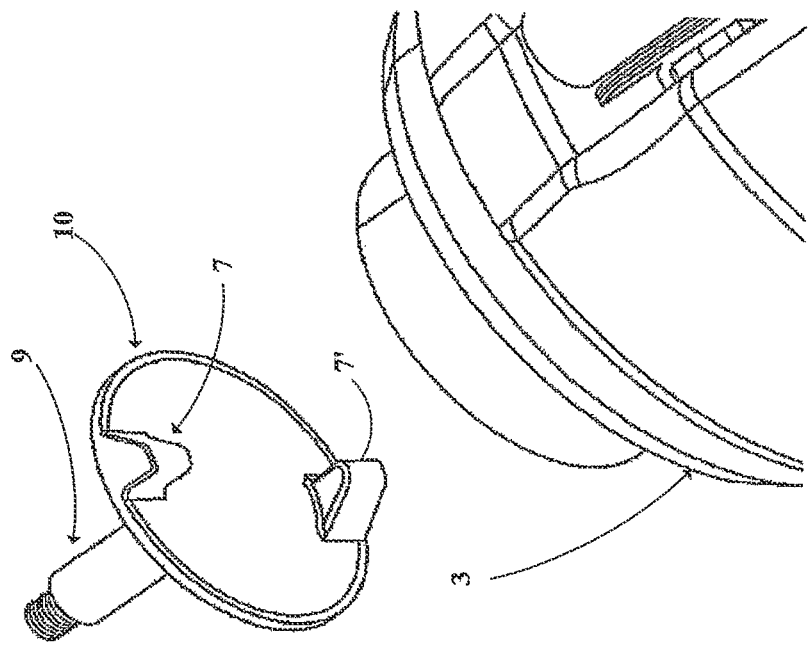
FIG. 3 shows a view in perspective of the connection system of the motor (5) with the axle for transmitting movement to the blades (2), with flanges (7) for attaching the connection system.

Additionally, and also with the purpose of minimizing the apparatus vibration when in operation, the appliance includes a connection system that lowers the differences of coupling between the appliance base (3), where the motor (5) is located, and the jar (1), where the crushing blades (2) are located to be driven by the motor (5) to blend the food. Such connection, shown in FIGS. 3 and 4, is constituted by only two corresponding coupling flanges between the coupled driving and driven parts. Preferably the crushing blades (2) have only two driven flanges (7) connected to them. The driven flanges (7), which are essentially vertical, are driven by vertical faces (7') located on each driven flange (7). Corresponding driving flanges (8) are connected to the motor (5) by the driving member (11). As shown in FIG. 4, the driving flanges (8) may be more numerous than the driven flanges (7), such as shown with six driving flanges. The driving flanges (8) rotate the driven flanges (7) connected to the blades (2) of the jar (1), thereby rotating the blades (2). The fact that there are only two flanges (7) between the coupled parts, that is, between the jar and the base, minimizes the eventual difference of coupling between the parts and, consequently, lowers the vibration of the set when in operation.

Associated with the previous features, the blender jar (1) has a design that promotes the optimization of the whirling of the food being stirred inside. This is characterized by the shape being an essentially tubular, or frustroconic form, of triangular cross-section with rounded corners. This shape allows that the stirred mass to be displaced in order to blend during the stirring, running into the walls from the thrust generated by the crushing blades (2) and blended, and returning to the blades by gravity. The absence of internal flanges and projections facilitates the sliding of the food along the walls and minimizes both the generated noise and the vibration of the assembly. Such jar (1) may be comprised of most rigid materials, and, preferably, the walls are transparent, to facilitate the visualization of the contents. The jar also preferably is easy to wash, to help avoid the accumulation of residues. In a preferred configuration, the jar (1) is formed by transparent plastic material, such as propylene, polypropylene, styrene, polystyrene terephthalate or the like. In an additional configuration, the jar (1) is made of glass and may be polished or decorated.

This innovation is not limited to the representations described or illustrated herein, and must be understood in its broad scope. Many modifications and other representations of the invention shall come to mind to those versed in the art to which this invention belongs, having the benefit of the teachings presented in the previous descriptions and enclosed drawings. It also is to be understood that the invention is not limited to the disclosed specific form, and that modifications and other forms are understood as included within the scope of the enclosed claims. Although specific terms are employed here, they are used only in a generic and descriptive way and not as a limitation on purpose.

The invention claimed is:

1. A blender comprising:
   a base;
   a motor in the base;
   a drive member coupled to the motor and adapted to rotate about a drive axis upon energization of the motor;
   a jar removably attached to the base, the jar having a triangular cross-section as viewed along the drive axis;
   a driven member rotatably mounted to the jar;
   blades mounted to the driven member;
   wherein the drive member engages the driven member by at least two flanges when the jar is attached to the base, the flanges being adapted to transfer rotation of the drive member to the driven member to thereby rotate the blades, wherein the driven member comprises two driven flanges and the drive member comprises more than two driving flanges.

2. The blender of claim 1, wherein the jar has a triangular cross section with rounded corners.

3. The blender of claim 1, wherein the jar is frustroconical.

4. The blender of claim 1, wherein the jar is tubular.

5. The blender of claim 1, wherein the jar lacks internal flanges or projections.

6. The blender of claim 1, wherein the driven flanges are connected to the driven member.

7. The blender of claim 1, wherein the driven flanges and the driving flanges comprise vertical faces through which rotation of the drive member is transferred to the driven member.

8. The blender of claim 1, further comprising a plurality of flexible joints between the motor and the base.

9. The blender of claim 8, wherein the plurality of flexible joints comprises at least three flexible joints.

* * * * *